United States Patent
Hu et al.

(10) Patent No.: US 10,554,431 B2
(45) Date of Patent: Feb. 4, 2020

(54) METHOD FOR DEVICE HAVING WLAN FUNCTION TO ACCESS NETWORK AND DEVICE FOR IMPLEMENTING METHOD

(71) Applicant: China IWNCOMM Co., LTD., Xi'an, Shaanxi (CN)

(72) Inventors: Yanan Hu, Shaanxi (CN); Bianling Zhang, Shaanxi (CN); Yuehui Wang, Shaanxi (CN); Weigang Tong, Shaanxi (CN); Manxia Tie, Shaanxi (CN); Zhiqiang Du, Shaanxi (CN)

(73) Assignee: China IWNCOMM Co., LTD., Xi'an, Shaanxi (CN)

( * ) Notice: Subject to any disclaimer, the term of this patent is extended or adjusted under 35 U.S.C. 154(b) by 352 days.

(21) Appl. No.: 15/525,602

(22) PCT Filed: Oct. 26, 2015

(86) PCT No.: PCT/CN2015/092835
§ 371 (c)(1),
(2) Date: May 10, 2017

(87) PCT Pub. No.: WO2016/086739
PCT Pub. Date: Jun. 9, 2016

(65) Prior Publication Data
US 2017/0338972 A1 Nov. 23, 2017

(30) Foreign Application Priority Data

Dec. 3, 2014 (CN) .......................... 2014 1 0742548

(51) Int. Cl.
*H04L 12/28* (2006.01)
*H04L 29/06* (2006.01)
(Continued)

(52) U.S. Cl.
CPC ........ *H04L 12/2803* (2013.01); *H04L 63/062* (2013.01); *H04W 4/70* (2018.02);
(Continued)

(58) Field of Classification Search
CPC ....... H04W 4/70; H04W 12/08; H04W 84/12; H04W 12/003; H04W 12/00516;
(Continued)

(56) References Cited

U.S. PATENT DOCUMENTS 8,495,373 B2 * 7/2013 Garcia Morchon .. H04L 9/0838
380/30
2009/0083846 A1 3/2009 Ding
(Continued)

FOREIGN PATENT DOCUMENTS

CN 101064628 A 10/2007
CN 101335647 A 12/2008
(Continued)

OTHER PUBLICATIONS

Extended European Search Report for Application No. 15864568.9 dated Nov. 6, 2017.
(Continued)

*Primary Examiner* — Abdullahi E Salad
(74) *Attorney, Agent, or Firm* — Wolf, Greenfield & Sacks, P.C.

(57) ABSTRACT

A method for a WLAN-enabled device to access to a network is provided, including the following steps. An intelligent terminal device acquires a key KEY1, encrypts, by using the KEY 1, access information of a wireless access device that is known by the intelligent terminal device, and then transmits the access information as well as the unique identification information. WLAN-enabled device sniffs and acquires the unique identification information and the encrypted access information, generates the KEY1 based on
(Continued)

the unique identification information and a preset key material, and decrypts the encrypted access information by using the KEY1 to obtain the access information. The present invention further relates to a WLAN-enabled device for implementing the method and an intelligent terminal device.

13 Claims, 5 Drawing Sheets

(51) Int. Cl.
 *H04W 12/08* (2009.01)
 *H04W 4/70* (2018.01)
(52) U.S. Cl.
 CPC ....... *H04W 12/08* (2013.01); *H04L 2012/285* (2013.01); *H04L 2012/2841* (2013.01)
(58) Field of Classification Search
 CPC . H04L 12/2803; H04L 63/062; H04L 9/0838; H04L 9/0866; H04L 9/0869; H04L 9/083; H04L 2012/2841; H04L 2012/285; H04L 2209/805
 See application file for complete search history.

(56) References Cited

U.S. PATENT DOCUMENTS

| 2011/0103589 | A1* | 5/2011 | Tie | H04L 9/0825 |
| | | | | 380/282 |
| 2012/0265996 | A1* | 10/2012 | Kaal | H04L 63/102 |
| | | | | 713/182 |
| 2013/0022196 | A1* | 1/2013 | Kambayashi | H04L 9/0836 |
| | | | | 380/44 |
| 2013/0081113 | A1* | 3/2013 | Cherian | H04W 4/70 |
| | | | | 726/4 |
| 2014/0373123 | A1 | 12/2014 | Kang | |
| 2015/0012743 | A1* | 1/2015 | Holtmanns | H04W 12/04 |
| | | | | 713/155 |

FOREIGN PATENT DOCUMENTS

| CN | 103607710 A | 2/2014 |
| CN | 103607713 A | 2/2014 |
| CN | 104125566 A | 10/2014 |
| JP | H10-210024 A | 8/1998 |
| JP | 2002-300411 A | 10/2002 |
| JP | 2008-211511 A | 9/2008 |
| JP | 2011-205489 A | 10/2011 |
| JP | 2012-080152 A | 4/2012 |
| WO | WO 2013/127014 A1 | 9/2013 |

OTHER PUBLICATIONS

Japanese $1^{st}$ Office Action dated Jul. 2, 2018 in connection with Application No. 2017-528900.
Chinese $1^{st}$ Office Action dated Jun. 21, 2018 in connection with Application No. 201410742548.
EP 15864568.9, Nov. 6, 2017, Extended European Search Report.
PCT/CN2015/092835, Jan. 17, 2016, International Search Report.
JP2017-528900, Mar. 11, 2019, Office Action.
International Search Report for Application No. PCT/CN2015/092835 dated Jan. 17, 2016.
Office Action for Japanese Application No. 2017-528900, dated Mar. 11, 2019.

* cited by examiner

METHOD FOR DEVICE HAVING WLAN FUNCTION TO ACCESS NETWORK AND DEVICE FOR IMPLEMENTING METHOD

This application is the national phase of International Application No. PCT/CN2015/092835, titled "METHOD FOR DEVICE HAVING WLAN FUNCTION TO ACCESS NETWORK AND DEVICE FOR IMPLEMENTING METHOD" filed on Oct. 26, 2015, which claims the priority to Chinese Patent Application No. 201410742548.3, titled "METHOD FOR DEVICE HAVING WLAN FUNCTION TO ACCESS NETWORK AND DEVICE FOR IMPLEMENTING METHOD", filed on Dec. 3, 2014 with the State Intellectual Property Office of People's Republic of China, both of which applications are incorporated by reference herein in their entireties.

FIELD

The disclosure relates to the technical field of network communications, and in particular to the technical field of smart home.

BACKGROUND

Intelligent home appliances refer to the technology that, based on functions of conventional home appliances, combines various appliance sub-systems associated with home living with each other, and intelligently control and manage them via a network according to personal requirement using computer technology, network communication technology and the like, thereby achieving a new people-oriented home living experience.

Referring to FIG. 1, in a good existing smart home solution, after bringing home a washing machine, a refrigerator or an electric lamp which is equipped with WLAN modules, a user enables a smart phone having a wireless local area network WLAN function to access to a wireless access device AP of his home, thereby accessing to the network, and then downloads from the network and installs an APP (Application) specified by the intelligent home appliance supplier. After the APP is installed, the smart phone transmits the network name SSID and the login password of the AP to which the smart phone accesses through the WLAN function. By then the intelligent home appliance may sniff and acquire the network name SSID and the login password of the AP using their WLAN modules and access to the AP, thereby accessing to the network. This solution is easy to operate for the user, and has a low cost for the manufacturer, thereby facilitating promotion of smart home systems. However, this solution has serious security problems, of which a most serious one is that, the intelligent appliances being able to sniff and acquire the SSID and the login password of the AP indicates that other intelligent devices can also sniff and acquire the SSID and the login password of the AP, which provides possibilities for unauthorized use of the wireless network, leakage of user privacy and even unlawful practices.

SUMMARY

In view of this, a method for a WLAN-enabled device to access to a network and a device for implementing the method are provided according to the present disclosure, in order to solve the security problem mentioned in BACKGROUND, such that users can enjoy the convenience brought by the smart home systems without worries.

A method for a WLAN-enabled device to access to a network is provided. The method relates to at least a WLAN-enabled device 10, an intelligent terminal device 20, and a wireless access device 30, where a key material 11 is preset in the WLAN-enabled device 10. Before the method is implemented, access information 31 of the wireless access device 30 is required to be known by the intelligent terminal device 20. The access information 31 generally includes an SSID and a password of an AP, or includes the SSID and a certificate of the AP. The method includes:

step S1, acquiring, by an intelligent terminal device 20, a key KEY1, where the KEY1 may be acquired from outside of the intelligent terminal device 20 or locally generated in the intelligent terminal device 20, and the KEY1 is generated using the key material 11 of the WLAN-enabled device 10 and unique identification information 21 of the intelligent terminal 20;

step S2, encrypting, by the intelligent terminal device 20, the access information 31 of the wireless access device 30 known by the intelligent terminal device 20 using the KEY1; and transmitting, by the intelligent terminal device 20, the encrypted access information 31 as well as the unique identification information 21; and step S3, receiving, by the WLAN-enabled device 10, the unique identification information 21 and the encrypted access information 31; generating, by the WLAN-enabled device 10, the KEY1 using the unique identification information 21 and the preset key material 11; and decrypting, by the WLAN-enabled device 10, the encrypted access information 31 using the KEY1, to acquire the access information 31.

The key material 11 may include a pre-shared key KEY0, where the KEY0 is distributed by a key center KC.

Alternatively, the key material 11 may include unique identification information 12 of the WLAN-enabled device 10.

A WLAN-enabled device for implementing the above method is further provided according to the present disclosure. The device includes a storage unit 101, a transceiving unit 201, and a processing unit 301, where the storage unit 101 is configured to store a preset key material 11;

the transceiving unit 201 is configured to receive unique identification information 21 of an intelligent terminal device 20 and encrypted access information 31 of a wireless access device transmitted by the intelligent terminal device 20; and the processing unit 301 is configured to generate a KEY1 using the unique identification information 21 and the key material 11, and decrypt the encrypted access information 31 using the KEY1, to acquire the access information 31.

The key material 11 may include a pre-shared key KEY0, where the KEY0 is distributed by a key center KC.

Alternatively, the key material 11 may include unique identification information 12 of the WLAN-enabled device 10.

An intelligent terminal device 20 is provided. The intelligent terminal device 20 includes a storage unit 102, a transceiving unit 202, and a processing unit 302, where the storage unit 102 is configured to store unique identification information 21 of the intelligent terminal device 20, access information 31 of a wireless access device 30 known by the intelligent terminal device 20, and a key KEY1 acquired by the intelligent terminal device 20;

the processing unit 302 is configured to encrypt the access information 31 using the KEY1; and the transceiving unit 202 is configured to transmit the unique identification information 21 of the intelligent terminal device 20 and the encrypted access information 31.

The key material 11 may include a pre-shared key KEY0, where the KEY0 is distributed by a key center KC.

Alternatively, the key material 11 may include unique identification information 12 of the WLAN-enabled device 10.

According to the present disclosure, the security problem can be solved by using a key material preset in the WLAN-enabled device. At the same time, for the user, the user experience is not influenced, and for the manufacturer, the additional cost for the WLAN-enabled device is low.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF THE EMBODIMENTS

To make the above object, features and advantages of the present disclosure more apparent and easier to be understood, particular embodiments of the disclosure are illustrated in detail in conjunction with the drawings hereinafter.

Figure 1:
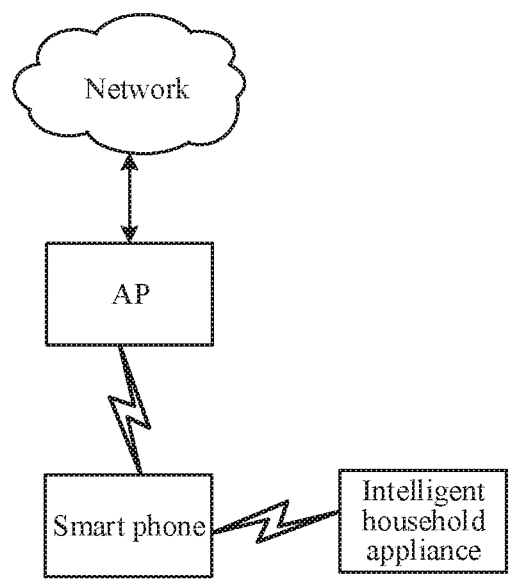
FIG. 1 is a schematic diagram of an existing smart home solution.
Figure 2:
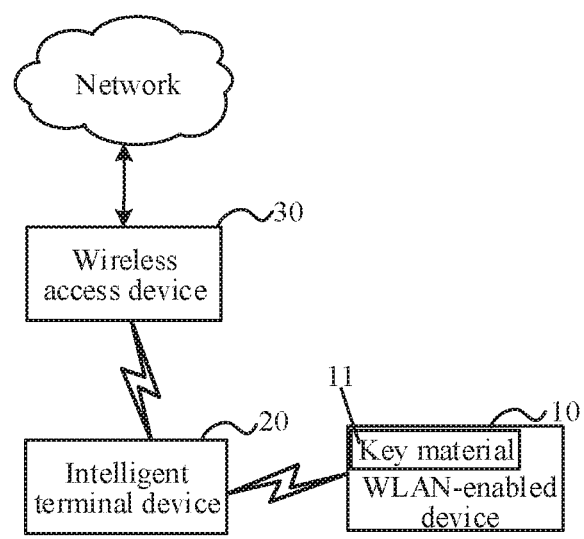
FIG. 2 is a schematic diagram of a core architecture of a smart home solution according to the present disclosure.
Figure 3:
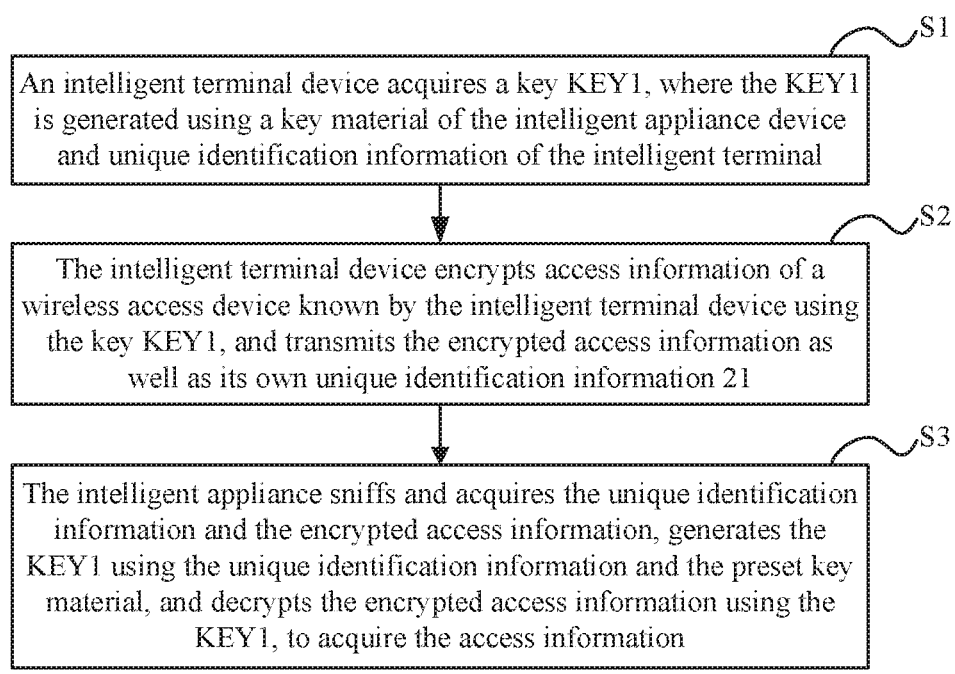
FIG. 3 is a flow chart of a method for a WLAN-enabled device to access to a network according to the present disclosure.

Referring to FIG. 2 and FIG. 3, a method for a WLAN-enabled device to access to a network is provided according to the present disclosure. The method relates to at least a WLAN-enabled device 10, an intelligent terminal device 20 and a wireless access device 30, where a key material 11 is preset in the WLAN-enabled device 10. The WLAN-enabled device 10 may include various devices having WLAN functions or equipped with WLAN modules and capable of functioning as network nodes, such as household appliances, gaming machines, media players and vehicles. The intelligent terminal device 20 may be an electronic device having a human-computer interaction interface, such as a cell phone, a computer, a PDA, and a tablet computer. Before the method is implemented, access information 31 of the wireless access device 30 is required to be known by the intelligent terminal device 20. The access information 31 generally includes an SSID and a password of an AP, or includes the SSID and a certificate of the AP. The method includes the following steps S1 to S3.

In step S1, the intelligent terminal device 20 acquires a key KEY1. The KEY1 may be acquired from outside of the intelligent terminal device 20 or locally generated in the intelligent terminal device 20. The KEY1 is generated using the key material 11 of the WLAN-enabled device and unique identification information 21 of the intelligent terminal device 20.

In step S2, the intelligent terminal device 20 encrypts the access information 31 of the wireless access device 30 known by the intelligent terminal device 20 using the key KEY1, and transmits the encrypted access information 31 as well as its own unique identification information 21.

The unique identification information 21 is information (for example, an MAC address) according to which the intelligent terminal device 20 can be uniquely determined. That is, the unique identification information 21 has a one-to-one correspondence with the intelligent terminal device 20, such that the intelligent terminal device 20 can be determined according to the unique identification information 21.

In step S3, the WLAN-enabled device 10 receives the unique identification information 21 and the encrypted access information 31, generates the KEY1 using the unique identification information 21 and the preset key material 11, and decrypts the encrypted access information 31 using the KEY1, to acquire the access information 31.

Thus, the WLAN-enabled device 10 can access to the wireless access device 30 using the access information 31, thereby accessing to the network. With this method, it is effectively avoided that other people sniffs and acquires the access information of the wireless access device 30, specially the password or the certificate, thereby preventing security problems.

Based on the above method, two specific implementations are provided according to the present disclosure, which includes a first implementation based on a pre-shared key mechanism and a second implementation based on a unique identifier ID.

First Implementation

Figure 4:
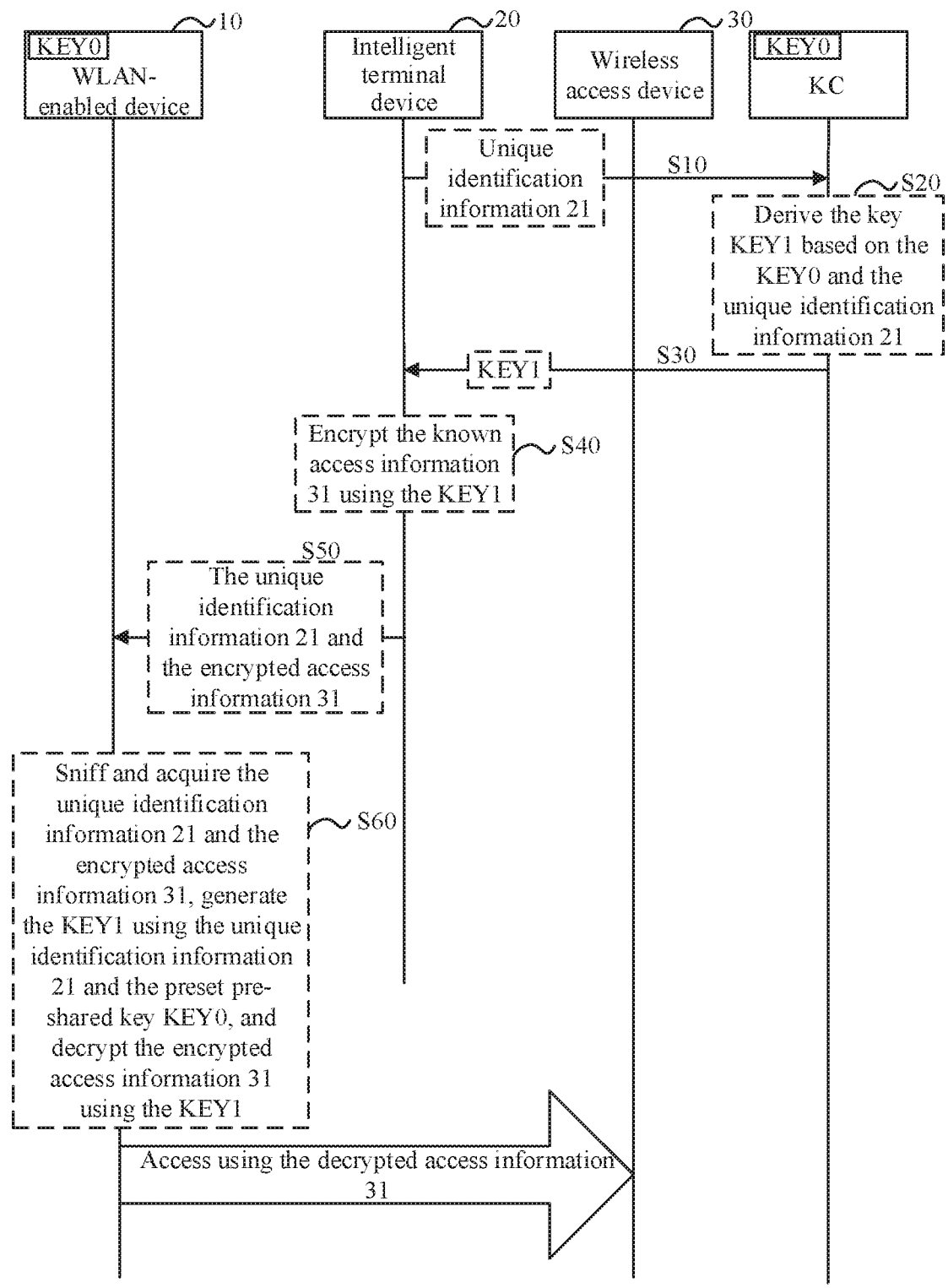
FIG. 4 is a schematic diagram of an implementation based on a pre-shared key of the method for a WLAN-enabled device to access to a network according to the present disclosure.

Reference is still made to FIG. 4. In this implementation, a pre-shared key KEY0 is adopted as the key material 11. The pre-shared key KEY0 is distributed by a key distribution center KC to the WLAN-enabled device 10. The key distribution center KC is responsible for generation, distribution and centralized management of pre-shared keys, thereby ensuring security of the pre-shared keys. This implementation includes the following steps S10 to S60.

In step S10, the intelligent terminal device 20 transmits its own unique identification information 21 to the key distribution center KC.

In step S20, the key distribution center KC derives the key KEY1 based on the KEY0 and the unique identification information 21.

In step S30, the key distribution center KC transmits the KEY1 to the intelligent terminal device 20.

In step S40, the intelligent terminal device 20 encrypts the access information 31 of the wireless access device 30 using the KEY1.

In step S50, the intelligent terminal transmits the encrypted access information 31 as well as its own unique identification information 21 via WLAN.

In step S60, the WLAN-enabled device 10 receives the unique identification information 21 and the encrypted access information 31, generates the KEY1 using the unique identification information 21 and the preset pre-shared key KEY0, and decrypts the encrypted access information 31 using the KEY1, to acquire the access information 31.

Thus, the WLAN-enabled device 10 can access to the wireless access device 30 using the decrypted access information 31, thereby accessing to the network.

It is recommended that the steps S10 to S30 are implemented in the following manner. The user logs into an APP on the intelligent terminal device 20. The APP submits user registration information (which may adopt a username-password mechanism) and the unique identification information 21 to the key distribution center KC. The KC firstly authenticates a user identity based on the APP user registration information, and then determines whether the KEY1 is stored in the APP according to key distribution request information upon successful authentication. The KC derives the key KEY1 using the KEY0 and the unique identification information 21 and distributes the key KEY1 to the APP in a case that the KEY1 is not stored in the APP, and does not distribute the KEY1 in a case that the KEY1 is stored in the intelligent terminal device 20 and does not need to be updated. The advantage of this manner lies in that security of the overall solution may be further enhanced by managing and controlling the APP. In addition, the APP is easy to use for the user and thus has a good user experience.

The steps S50 to S60 may be implemented in the following manner. The intelligent terminal device 20 issues an access configuration announcement via an air interface by transmitting a specific address data frame (a specific multicast address) or a WLAN management frame. Announcement information includes the access information 31 encrypted using the KEY1 and includes the unique identification information 21. In a case that the WLAN management frame is adopted, a management frame of a currently reserved type may be used, and the access configuration announcement is packaged in a data frame body of the management frame. In a case that the multicast data frame is adopted, the access configuration announcement is packaged in the last 23 bits of 238.x.x.x. In this case, the complete parameter information needs to be transmitted using multiple specific data frames since each specific address data package has only 23 bits for transmitting the parameter information. The WLAN-enabled device 10 sniffs (when operating in a scan-sniff mode) and receives the access configuration announcement transmitted by the intelligent terminal device 20, to acquire the unique identification information 21 and the encrypted access information 31. The WLAN-enabled device 10 generates the KEY1 using the unique identification information 21 and the preset pre-shared key KEY0, and decrypts the encrypted access information 31 using the KEY1, to acquire the access information 31. The advantage of this manner lies in that transmission of the access information 31 may be implemented between the intelligent terminal and the WLAN-enabled device without bidirectional data interaction, thus the WLAN-enabled device 10 is not required to have communication data interaction capability, thereby reducing a cost of the device 10.

Second Implementation

Figure 5:
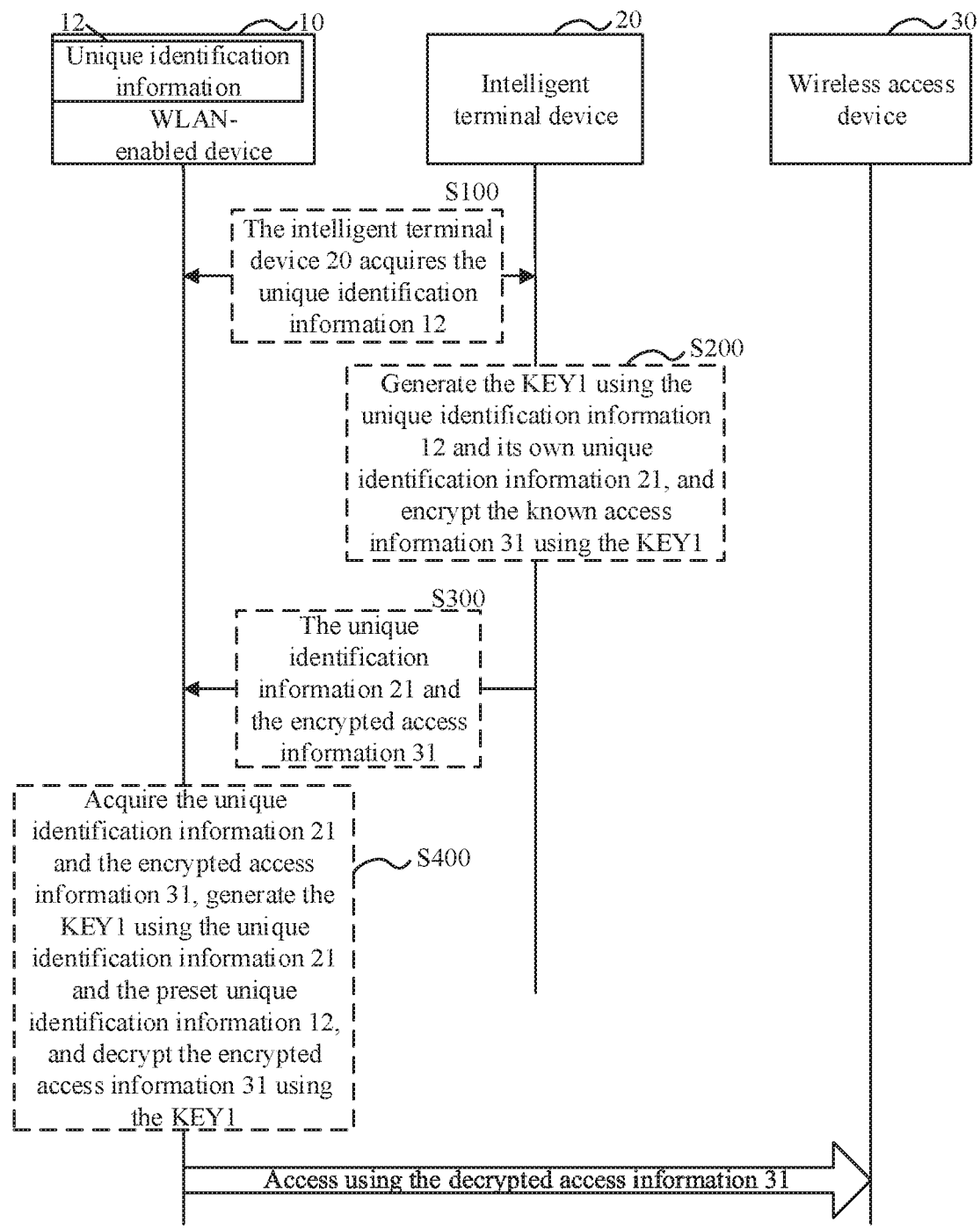
FIG. 5 is a schematic diagram of an implementation based on a unique identifier ID of the method for a WLAN-enabled device to access to a network according to the present disclosure.
Figure 6:
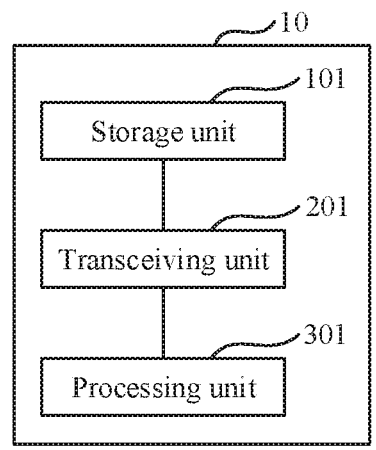
FIG. 6 is a schematic structural diagram of a WLAN-enabled device according to the present disclosure.
Figure 7:
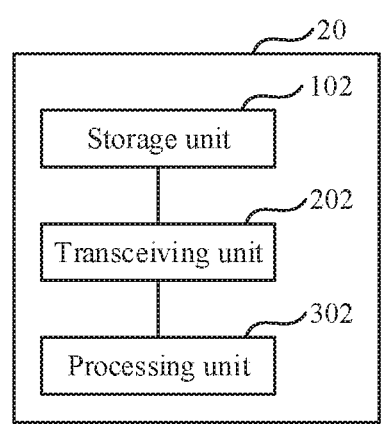
FIG. 7 is a schematic structural diagram of an intelligent terminal device according to the present disclosure.

Reference is still made to FIG. 5. In this implementation, the key material 11 is unique identification information 12 of the WLAN-enabled device 10. The unique identification information 12 of the WLAN-enabled device 10 may be a serial number, a one-dimensional bar code, a two-dimensional code, NFC readable information, or certain information in a product specification. This implementation includes the following step S100 to S400.

In step S100, the intelligent terminal device 20 acquires the unique identification information 12 of the WLAN-enabled device 10.

In step S200, the intelligent terminal device 20 generates the KEY1 using its own unique identification information 21 and the unique identification information 12 of the WLAN-enabled device 10, and encrypts the access information 31 of the wireless access device 30 known by the intelligent terminal device 20 using the KEY1.

In step S300, the intelligent terminal device 20 transmits the access information 31 encrypted using the KEY1 as well as its own unique identification information 21.

In step S400, the WLAN-enabled device 10 receives the unique identification information 21 and the encrypted access information 31, generates the KEY1 using the unique identification information 21 and the preset unique identification information 12, and decrypts the encrypted access information 31 using the key KEY1, to acquire the access information 31.

Thus, the WLAN-enabled device 10 can access to the wireless access device 30 using the decrypted access information 31, thereby accessing to the network.

The steps S100 to S200 may be implemented in the following manner. The user logs into an APP on the intelligent terminal device 20. The APP submits user registration information (which may adopt a username-password mechanism) and the unique identification information 21 to a background server. The background server authenticates a user identity based on the APP user registration information. The APP acquires the unique identification information 12 (the unique identification information 12 may be a serial number or certain information in a produce specification, in which case the user may manually input the unique identification information 12 such that the APP acquires the unique identification information 12; or the unique identification information 12 may also be a one-dimensional bar code, a two-dimensional code or NFC readable information, in which case the APP can acquire the unique identification information 12 by scanning) of the WLAN-enabled device 10 which needs to perform access, through user operation upon successful authentication, such that the intelligent terminal device 20 derives the KEY1 based on the unique identification information 12 and the unique identification information 21 of the intelligent terminal device 20. The advantage of this manner lies in that security of the overall implementation may be further enhanced by managing and controlling the APP. In addition, the APP is easy to use for the user and has a good user experience. Generally, only the user who purchases the WLAN-enabled device 10 or a person authorized by the user can acquire the unique identification information 12, thus the security is enhanced.

The steps S300 to S400 may be implemented in the following manner. The intelligent terminal device 20 issues an access configuration announcement via an air interface by transmitting a specific address data frame (a specific multicast address) or a WLAN management frame. Announcement information includes the access information 31 encrypted using the KEY1 and includes the unique identification information 21. In a case that the WLAN management frame is adopted, a management frame of a currently reserved type may be used, and the access configuration announcement is packaged in a data frame body of the management frame. In a case that the multicast data frame is adopted, the access configuration announcement is packaged in the last 23 bits of 238.x.x.x. In this case, the complete parameter information needs to be transmitted using multiple specific data frames since each specific address data package has only 23 bits for transmitting the parameter information. The WLAN-enabled device 10 sniffs (when operating in a scan-sniff mode) and receives the access configuration announcement transmitted by the intelligent terminal device 20, to acquire the unique identification information 21 and the encrypted access information 31. The WLAN-enabled device 10 generates the KEY1 using the unique identification information 21 and the preset unique identification information 12, and decrypts the encrypted access information 31 using the KEY1, to acquire the access information 31.

A WLAN-enabled device 10 for implementing the above method is further provided according to the present disclosure. The WLAN-enabled device 10 includes a storage unit 101, a transceiving unit 201, and a processing unit 301.

The storage unit 101 is configured to store a preset key material 11.

The transceiving unit 201 is configured to receive unique identification information 21 of an intelligent terminal device 20 and encrypted access information 31 of a wireless access device transmitted by the intelligent terminal device 20.

The processing unit 301 is configured to generate a KEY1 using the unique identification information 21 and the key material 11, and decrypt the encrypted access information 31 using the KEY1, to acquire the access information 31.

The key material 11 may include a pre-shared key KEY0. The pre-shared key KEY0 is distributed by a key center KC.

Alternatively, the key material 11 may include unique identification information 12 of the WLAN-enabled device 10.

An intelligent terminal device 20 for implementing the above method is further provided according to the present disclosure. The intelligent terminal device 20 includes a storage unit 102, a transceiving unit 202, and a processing unit 302.

The storage unit 102 is configured to store unique identification information 21 of the intelligent terminal device 20, access information 31 of a wireless access device 30 known by the intelligent terminal device 20, and a key KEY1 acquired by the intelligent terminal device 20.

The processing unit 302 is configured to encrypt the access information 31 using the KEY1.

The transceiving unit 202 is configured to transmit the unique identification information 21 of the intelligent terminal device 20 and the encrypted access information 31.

The key material 11 may include a pre-shared key KEY0. The KEY0 is distributed by a key center KC. In this case, the transceiving unit 202 is further configured to transmit the unique identification information 21 to the key center KC, and receive the key KEY1 derived by the key distribution center KC based on the KEY0 and the unique identification information 21. The intelligent terminal device 20 may further include an APP for invoking the transceiving unit 202 to transmit user registration information (which may adopt a username-password mechanism) and the unique identification information 21 to the key distribution center KC, and receiving the KEY1 distributed by the KC.

Alternatively, the key material 11 may include unique identification information 12 of the WLAN-enabled device 10. In this case, the intelligent terminal device 20 further includes an acquisition unit 402 configured to acquire the unique identification information 12. The unique identification information 12 may be a serial number or certain information in a product specification. In this case, the acquisition unit 402 acquires the unique identification information 12 by means of manual user input. Alternatively, the unique identification information 12 may be a one-dimensional bar code, a two-dimensional code or NFC readable information. In this case, the acquisition unit 402 acquires the unique identification information 12 by scanning. The intelligent terminal device 20 may further include an APP for invoking the transceiving unit 202 to transmit the user registration information (which may adopt a username-password mechanism) of the APP to a background server for authentication, and generating or invoking the processing unit 302 to generate the KEY1 using the unique identification information 21 and the unique identification information 12 upon successful authentication.

It should be noted that, those skilled in the art can understand that all of or a part of steps of the above method embodiments may be performed by instructing corresponding hardware through a computer program. The proceeding program may be stored in a computer readable storage medium. When being executed, the program performs the steps of the above method embodiments. The storage medium includes a magnetic disc, an optic disc, a read-only memory (ROM), a random access memory (RAM), or the like.

It should be further noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent in the process, method, article or device. Unless expressively limited otherwise, the statement "comprising (including) one . . . " does not exclude the case that other similar elements may exist in the process, method, article or device.

The method for a WLAN-enabled device to access to a network and the device for implementing the method provided according to the present disclosure are described in detail above. The principles and implementations are clarified using specific embodiments herein. The above description of the embodiments is only intended to help understanding the method of the present disclosure and the key concept thereof. In addition, changes can be made to the specific embodiments and the application scope by those skilled in the art based on the concept of the present disclosure. In summary, the specification should not be interpreted as limitation to the present disclosure.

The invention claimed is:

1. A method for a WLAN-enabled device to access to a network, comprising:

step S1, acquiring, by an intelligent terminal device, a key KEY1, wherein the KEY1 is acquired from outside of the intelligent terminal device or locally generated in the intelligent terminal device, and the KEY1 is generated using a key material of the WLAN-enabled device and unique identification information of the intelligent terminal device, wherein the key material comprises a pre-shared key KEY0 distributed by a key distribution center KC or unique identification information of the WLAN-enabled device;

step S2, encrypting, by the intelligent terminal device, access information of a wireless access device known by the intelligent terminal device using the KEY1; and transmitting, by the intelligent terminal device, the encrypted access information as well as the unique identification information of the intelligent terminal device; and step S3, receiving, by the WLAN-enabled device, the unique identification information and the encrypted access information; generating, by the WLAN-enabled device, the KEY1 using the unique identification information and the preset key material; and decrypting, by the WLAN-enabled device, the encrypted access information using the KEY1, to acquire the access information.

2. The method according to claim 1, wherein in a case that the key material comprises the pre-shared key KEY0, the method comprises:

step S10, transmitting, by the intelligent terminal device, the unique identification information to the key distribution center KC;

step S20, deriving, by the key distribution center KC, the key KEY1 based on the KEY0 and the unique identification information;

step S30, transmitting, by the key distribution center KC, the KEY1 to the intelligent terminal device;

step S40, encrypting, by the intelligent terminal device, the access information of the wireless access device using the KEY1;

step S50, transmitting, by the intelligent terminal device, the encrypted access information as well as the unique identification information via WLAN; and step S60, receiving, by the WLAN-enabled device, the unique identification information and the encrypted access information; generating, by the WLAN-enabled device, the KEY1 using the unique identification information and the KEY0; and decrypting, by the WLAN-enabled device, the encrypted access information using the key KEY1, to acquire the access information.

3. The method according to claim 2, wherein the steps S10 to S30 comprises:

installing an APP on the intelligent terminal device;

submitting, by the APP, user registration information and the unique identification information to the key distribution center KC;

authenticating, by the KC, an user identity based on the user registration information of the APP;

determining, by the KC, whether the KEY1 is stored in the APP according to key distribution request information upon successful authentication;

distributing, by the KC, the key KEY1 derived using the KEY0 and the unique identification information, to the APP in a case that the KEY1 is not stored in the APP, while not distributing the KEY1 in a case that the KEY1 is stored in the intelligent device terminal and does not need to be updated.

4. The method according to claim 2, wherein the steps S50 to S60 comprises:

issuing, by the intelligent terminal device, an access configuration announcement via an air interface using a specific address data frame or a WLAN management frame, wherein announcement information comprises the access information encrypted using the KEY1 and comprises the unique identification information, and sniffing and receiving, by the WLAN-enabled device operating in a scan-sniff mode, the access configuration announcement.

5. The method according to claim 1, wherein in a case that the key material comprises the unique identification information of the WLAN-enabled device, the method comprises:

step S100, acquiring, by the intelligent terminal device, the unique identification information of the WLAN-enabled device;

step S200, generating, by the intelligent terminal device, the KEY1 using the unique identification information of the intelligent terminal device and the unique identification information of the WLAN-enabled device; and encrypting, by the intelligent terminal device, the access information of the wireless access device known by the intelligent terminal device using the KEY1;

step S300, transmitting, by the intelligent terminal device, the access information encrypted using the KEY1, as well as the unique identification information of the intelligent terminal device; and step S400, receiving, by the WLAN-enabled device, the unique identification information of the intelligent terminal device and the encrypted access information; generating, by the WLAN-enabled device, the KEY1 using the unique identification information of the intelligent terminal device and the unique identification information of the WLAN-enabled device; and decrypting, by the WLAN-enabled device, the encrypted access information using the KEY1, to acquire the access information.

6. The method according to claim 5, wherein the steps S100 to S200 comprises:

installing an APP on the intelligent terminal device;

logging, by a user, into the APP on the intelligent terminal device;

submitting, by the APP, user registration information and the unique identification information of the intelligent terminal device to a background server;

authenticating, by the background server, an user identity based on the user registration information of the APP; and acquiring, by the APP, the unique identification information of the WLAN-enabled device which needs to perform access, through user operation upon successful authentication, wherein the intelligent terminal device derives the KEY1 based on the unique identification information of the WLAN-enabled device and the unique identification information of the intelligent terminal device, wherein the unique identification information of the WLAN-enabled device comprises a serial number or certain information in a product specification, and is manually inputted by a user; or the unique identification information of the WLAN-enabled device comprises a one-dimensional bar code, a two-dimensional code or NFC readable information, and is acquired by scanning.

7. The method according to claim 5, wherein the steps S300 to S400 comprises:

issuing, by the intelligent terminal device (20), an access configuration announcement via an air interface by transmitting a specific address data frame or a WLAN management frame, wherein announcement information comprises the access information encrypted using the KEY1 and comprises the unique identification information of the intelligent terminal device, and sniffing and acquiring, by the WLAN-enabled device, the access configuration announcement.

8. A WLAN-enabled device, comprising
a storage,
a transceiver, and
a processor, wherein
the storage is configured to store a preset key material, wherein the key material comprises a pre-shared key KEY0 distributed by a key distribution center KC or unique identification information of the WLAN-enabled device;
the transceiver is configured to receive unique identification information of an intelligent terminal device and encrypted access information of a wireless access device transmitted by the intelligent terminal device; and
the processor is configured to generate a KEY1 using the unique identification information and the key material, and decrypt the encrypted access information using the KEY1, to acquire the access information.

9. An intelligent terminal device, comprising
a storage,
a transceiver, and
a processor, wherein
the storage is configured to store unique identification information of the intelligent terminal device, access information of a wireless access device known by the intelligent terminal device, and a key KEY1 acquired by the intelligent terminal device, wherein the KEY1 is generated using a key material of a WLAN-enabled device and unique identification information of the intelligent terminal, and wherein the key material comprises a pre-shared key KEY0 distributed by a key distribution center KC or unique identification information of the WLAN-enabled device;
the processor is configured to encrypt the access information using the KEY1; and
the transceiver is configured to transmit the unique identification information of the intelligent terminal device and the encrypted access information.

10. The device according to claim 9, wherein:
in a case that the key material comprises the pre-shared key KEY0,
the transceiver is further configured to transmit the unique identification information to the key center KC, and receive the key KEY1 derived by the key distribution center KC based on the KEY0 and the unique identification information.

11. The device according to claim 10, further comprising:
an APP for invoking the transceiver to transmit user registration information of the APP and the unique identification information to the key distribution center KC, and receiving the KEY1 distributed by the KC.

12. The device according to claim 9, wherein:
in a case that the key material comprises the unique identification information of the WLAN-enabled device,
the device further configured to acquire the unique identification information of the WLAN-enabled device, wherein
the unique identification information of the WLAN-enabled device comprises a serial number or certain information in a product specification, and is acquired by means of manual user input; or the unique identification information of the WLAN-enabled device comprises a one-dimensional bar code, a two-dimensional code or NFC readable information, and is acquired by means of scanning.

13. The device according to claim 12, further comprising:
an APP for invoking the transceiver to transmit user registration information of the APP to a background server for authentication, and generating or invoking the processor to generate the KEY1 using the unique identification information of the intelligent terminal device and the unique identification information of the WLAN-enabled device upon successful authentication.

* * * * *